United States Patent [19]

Schumacher

[11] 4,351,159

[45] Sep. 28, 1982

[54] ENERGY RECOVERY SYSTEM

[75] Inventor: Frank A. Schumacher, Louisville, Ky.

[73] Assignee: General Electric Company, Louisville, Ky.

[21] Appl. No.: 240,750

[22] Filed: Mar. 5, 1981

[51] Int. Cl.³ .......................... F25B 7/00; F25B 27/02
[52] U.S. Cl. ........................................ 62/79; 62/238.6
[58] Field of Search ................ 62/79, 238.6; 237/2 B, 237/19; 165/DIG. 12

[56] References Cited

U.S. PATENT DOCUMENTS

| | | | |
|---|---|---|---|
| 2,042,812 | 6/1936 | Tull et al. | 62/238.6 |
| 2,125,842 | 8/1938 | Eggleston | 62/238.6 |
| 2,700,279 | 1/1955 | Stickel | 62/238.6 |
| 3,301,002 | 1/1967 | McGrath | 62/238.6 |
| 4,141,222 | 2/1979 | Ritchie | 62/238.6 |
| 4,270,359 | 6/1981 | Hummel | 62/238.6 X |
| 4,293,093 | 10/1981 | Raymond et al. | 62/238.6 X |

Primary Examiner—Lloyd L. King
Attorney, Agent, or Firm—Frederick P. Weidner; Radford M. Reams

[57] ABSTRACT

A method of providing auxiliary hot water to a hot water system wherein water is conducted into the system from a water supply and divided into a cold water branch and a hot water branch with the hot water branch including a hot water heating tank and each branch terminating downstream at a valve. The water to be heated in the hot water heating tank is introduced into the bottom of the tank and expelled out the top thereof for delivery to the hot water branch valve. Water is conducted from the cold water branch to refrigerating apparatus having a condenser, evaporator and compressor. Water is circulated in heat transfer relationship with the condenser and preferably also with the compressor to heat the water and the auxiliary hot water is pumped into the hot water branch between the hot water heating tank and the hot water branch valve when the temperature of the heated water is above 110° F.

5 Claims, 2 Drawing Figures

ENERGY RECOVERY SYSTEM

BACKGROUND OF THE INVENTION

This invention relates to an energy recovery system wherein refrigerating apparatus is utilized to heat water for use as auxiliary hot water in a water system. More particularly, the invention provides for cooling the heat generating components of refrigerating apparatus and recover some of the energy used in operating the components in the form of by-product heat for heating water to provide auxiliary hot water to a water system.

In a typical refrigeration circuit, such as utilized in household refrigerators, considerable heat is generated during the compression of the system refrigerant, and such heat occurs in the hot gases being compressed. The possibility of utilizing this waste or by-product heat has long been recognized and the prior art discloses a number of arrangements wherein this heat can be recovered for practical use, usually for water heating purposes, and reference may be made to U.S. Pat. Nos. 2,042,812; 2,125,842; 2,700,279; 3,301,002; and 4,141,222.

In refrigerating apparatus, the condenser acts to cool the high temperature refrigerant gas delivered to it from the compressor in order to convert the gas into liquid. It is desirable to be able to cool the condenser as by a water cooling arrangement thereby enhancing its functional purpose in the refrigerating system and also recover the energy expanded in producing the by-product heat by using the water heated in the process of cooling the condenser as auxiliary hot water in a water system. With such a water cooling arrangement, it is desirable that minimum heat be expelled to ambient. Also, the customary fan used to cool the components may be eliminated.

Several types of controls have been utilized to prevent excessive water temperatures from occurring within the hot water storage tank in energy recovery systems used in conjunction with refrigerating apparatus. One such system is disclosed in U.S. Pat. No. 2,042,812 wherein a pump which circulates water from the hot water storage tank through the refrigerating apparatus and back into the tank operates only when the hot water in the tank is below a maximum preselected temperature. Such an arrangement causes the circulating pump to continually cycle, and during continuous refrigeration system operation during low hot water consumption periods, the water within the storage tank may be subject to stratification thereby limiting the water temperature level within the tank. Moreover, the lack of water circulation in the refrigerating apparatus system during its operation does not provide for cooling of the operating components such as the condenser and compressor. In addition, the by-product heat generated during the time the refrigerating apparatus is operating is not recovered and utilized for heating water.

Other energy recovery systems utilize a separate heat exchanger in conjunction with the refrigerating apparatus and have water from a tank conducted through the heat exchanger or not through the heat exchanger depending upon a predetermined water temperature being achieved. See, for example, U.S. Pat. No. 4,141,222. Such a system, however, does not provide for cooling of the heat generating components of the refrigerating apparatus in the event that the water in the tank is hot enough so that the heat exchanger is bypassed.

By my invention, there is provided in a hot water system a means to obtain auxiliary hot water by recovering heat generated by refrigerating apparatus and at the same time provide a cooling system for the refrigerating apparatus which allows for more efficient operation of the refrigerating apparatus.

SUMMARY OF THE INVENTION

According to one aspect of my invention, there is a method of providing auxiliary hot water to a water system which includes conducting water into the system from a water supply and dividing the incoming water at a junction into a cold water branch and a hot water branch, said hot water branch including a hot water heating tank, and each branch terminating downstream at a valve. Water to be heated by the hot water heating tank is introduced into the bottom of the tank and expelled out the top thereof for delivery to the hot water branch valve. Water for the auxiliary hot water is conducted from the cold water branch to refrigerating apparatus which apparatus has a condenser, evaporator and compressor. The water conducted into the refrigerating apparatus is circulated in heat transfer relationship with the condenser to heat the water and preferably also circulated in heat transfer relationship with the compressor. The water is conducted from the cold water branch to the refrigerating apparatus only when the water in heat transfer relation with the condenser and preferably also the compressor is above 110° F. The heated water from the refrigerating apparatus is pumped into the hot water branch between the hot water heating tank and the hot water branch valve when the temperature of the heated water is above 110° F.

DESCRIPTION OF THE PREFERRED EMBODIMENT

Figure 1:
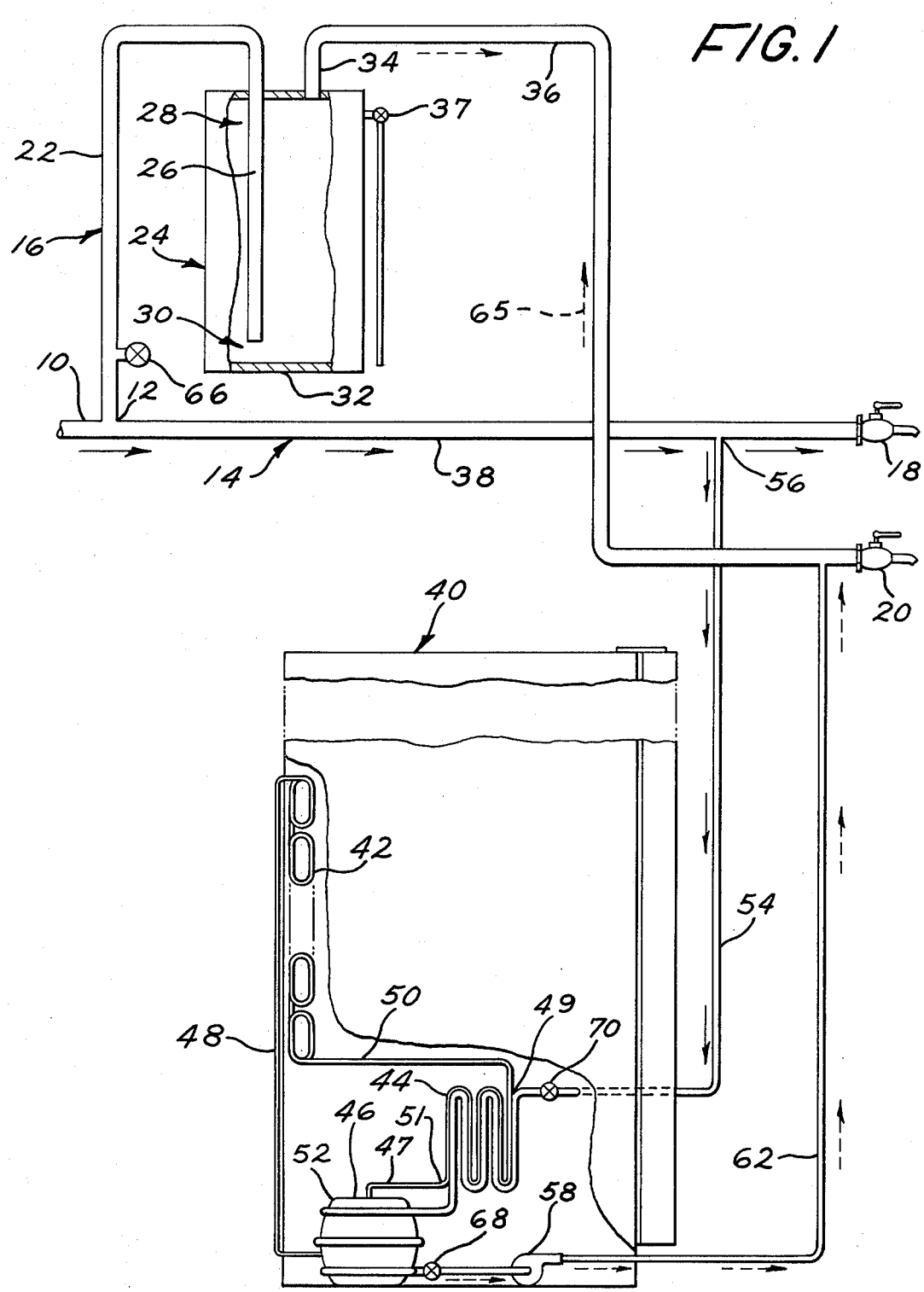
FIG. 1 is a schematic view of a water system showing one embodiment utilizing the present invention.

With reference to FIG. 1 of the drawing, there is illustrated a water system such as utilized in a domestic private residence wherein water is introduced into the system from a supply such as a water main supplying water to a community from a pumping station. The pressurized water is introduced into the system through an inlet conduit 10 and from the inlet conduit 10, the water supply is divided at a junction or T connection 12 into a cold water branch 14 and a hot water branch 16. Both of these branches terminate at their respective faucets or valves 18 and 20. Typically, the valves 18 and 20 may, for instance, be located in the kitchen and supply water to the kitchen sink (not shown). A plurality of faucets or valves may, of course, be connected along the water branches 14 and 16 to serve the needs of the household. The hot water flow in the system is shown by broken line arrows and the cold water flow in the system is shown by solid line arrows.

Water being diverted into the hot water branch 16 from junction 12 flows through conduit 22 to a hot water heating tank 24 and is introduced into the tank at the bottom thereby by means of an interconnected tube 26 inside the hot water heating tank extending from the top area 28 downwardly into the bottom area 30 of the hot water heating tank 24 and spaced just above the bottom wall 32 of the hot water heating tank 24.

The water heated inside the hot water heating tank 24 as by conventional heating means is withdrawn or expelled from the hot water heating tank 24 through a tube 34 and an interconnecting conduit 36 carries the hot water to the hot water branch valve 20. When valve 20 is opened, the water pressure in the hot water branch, as a result of the pressure supplied to the system by the water supply through inlet conduit 10, is sufficient to flow the water from the inlet conduit 10 through conduit 22 via junction 12 into the hot water heating tank 24 at the bottom thereof and out of the tank at the top thereof and conduit 36 carries the hot water to the faucet or valve 20 for use. The hot water heating tank 24 conventionally has a high pressure/temperature relief valve 37.

The cold water branch 14 receives its water from the inlet conduit 10 through junction 12 and by means of a conduit 38, the water will flow to its valve 18 and when valve 18 is opened, water will flow through the cold water branch as a result of the pressure supplied to the system by the water supply through inlet conduit 10.

Figure 2:
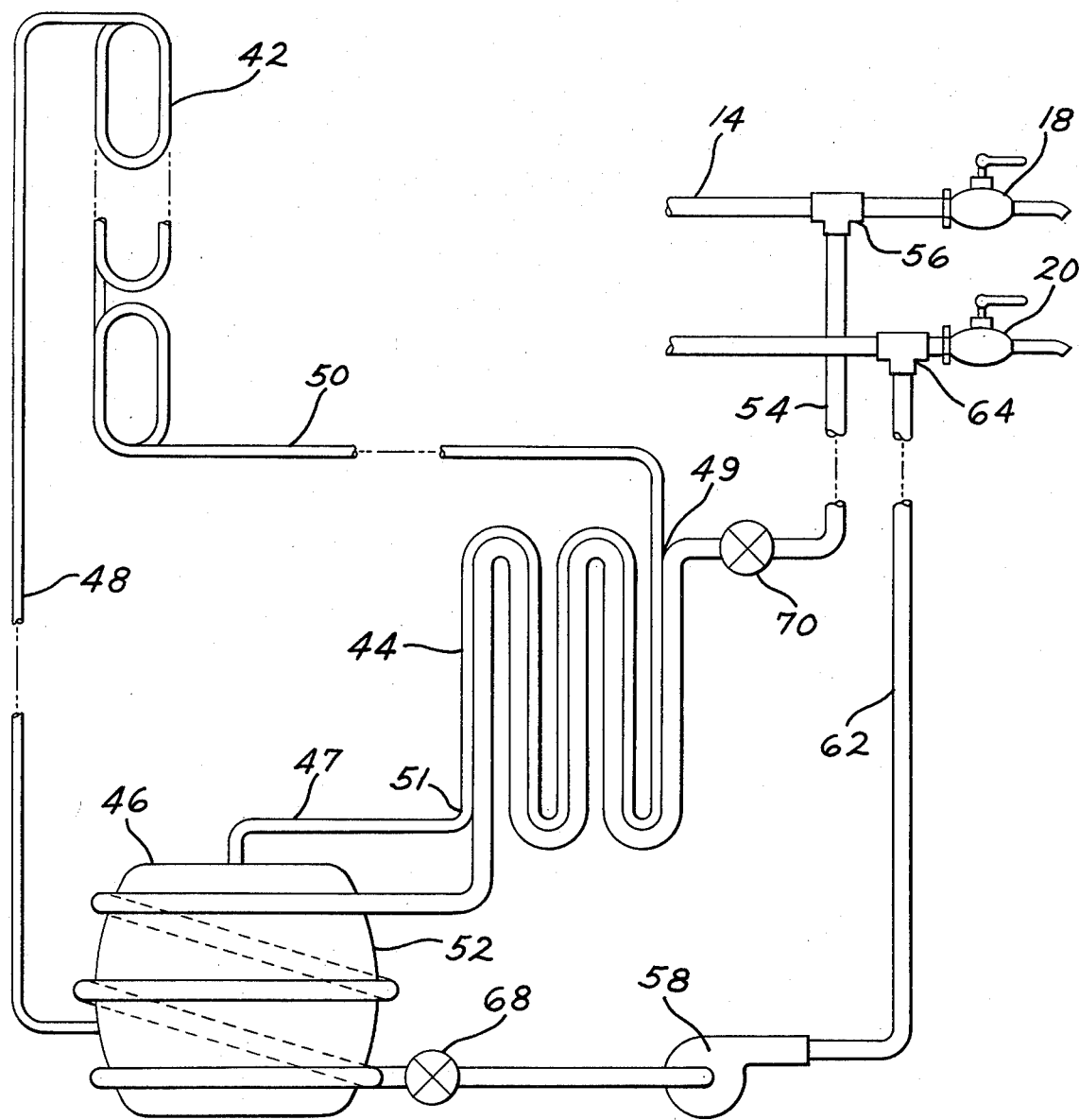
FIG. 2 is an enlarged view of a portion of the refrigerating apparatus shown in the water system of FIG. 1.

With reference to both FIGS. 1 and 2, there is shown refrigerating apparatus 40 which may be in the form of a household refrigerator 40 which includes a motor and compressor unit 46, a serpentine condenser 44, and an evaporator 42 which comprises coils. A suction line 48 is arranged between the evaporator 42 and the compressor 46 for conducting gasified refrigerant from the evaporator to the compressor, and a capillary tube 50 is provided for conducting liquefied refrigerant from the condenser 44 to the evaporator 42.

In refrigerating apparatus of the type disclosed, the compressor 46 draws or removes the low pressure gasified refrigerant from the suction line 48 into the compressor 46 which compresses the gas and discharges the same through a conduit 47 into the serpentine coils of the condenser 44. The refrigerant gas is discharged from the compressor 46 at a high pressure and consequently at a relatively high temperature. The high temperature gas loses its heat while passing through the condenser 44. The result of the withdrawal of heat from the gas by means of the condenser 44 is that the gas is thereby converted into liquid refrigerant. The liquid refrigerant then passes through the capillary tube 50 and into the evaporator 42. The refrigerant will evaporate in the evaporator 42 and heat is absorbed from the compartment or area to be cooled inside the refrigerating apparatus. When the temperature of the compartment or area to be cooled is reduced to a predetermined level, suitable temperature responsive controls (not shown) will function to break the motor circuit and stop operation of the compressor. After the refrigerant in the evaporator 42 has ceased to absorb heat from the compartment to be cooled, the temperature of the compartment will rise until a predetermined temperature level is reached at which time with controls will close the motor circuit and start the compressor 46 to operate so as to begin the refrigerating cycle again.

In the normal function if the refrigerating apparatus described above, the heat generated by the condenser 44 is lost to the ambient atmosphere surrounding the condenser. In addition, it is well known that the operation of the compressor 46 also generates a significant amount of heat that radiates from the outside shell 52 of the compressor 46. To recover the energy utilized in generating the by-product heat, both for the condenser 44 and evaporator 46, I provide for a flow of cold water by means of a conduit 54 tapped into the cold water branch 14 at junction 56 so that cold water from the cold water branch may flow in heat transfer relationship with the condenser 44 and the compressor 46 to absorb the heat generated within those components. The cold water flowing in heat transfer relationship with the condenser 44 is preferably first heated at the outlet end 49 of the condenser and then progressively along the condenser to the inlet end 51 thereof and then to the compressor 46. The reason for this to obtain maximum heat transfer efficiency. After circulating the water in conduit 54 in heat transfer relationship with the condenser 44 and compressor 46, it is delivered to a pump 58. The pump 58 via conduit 62 connecting pump 58 and the hot water branch 16 at a junction 64 located between the hot water heating tank 24 and the valve 20 of the hot water branch 16 delivers the auxiliary hot water to the hot water branch 16. The pump 58 may be located anywhere in the conduit 54 such as between the condenser 44 and the junction 56 for instance so long as it functions to pump the water through conduit 54 when operated.

When the auxiliary heated hot water is pumped into the hot water branch 16 and valve 20 is closed, the auxiliary hot water will flow back into the hot water heating tank 24 by conduit 36 and tube 34 as shown by dashed line arrow 65. In this manner, the cold water from the cold water branch 14 will not only cool the compressor 46 and condenser 44 of the refrigerating apparatus but the water absorbing the heat from those components may be utilized as auxiliary hot water.

In the event that the hot water heating tank 24 is full of hot water and auxiliary hot water from the refrigerating apparatus is added, there must be a means for expelling the excess hot water from the tank to and prevent any hot water from the hot water heating tank 24 from backing up into the cold water line 14 through junction 12. To accomplish this, I provide for a temperature sensitive valve 66 located in conduit 22 between the hot water heating tank 24 and the junction 12. When the hot water heating tank 24 is full of hot water and more auxiliary hot water from the refrigerating apparatus enters the tank, the coldest water which is in the bottom area 30 of the hot water heating tank 24 is forced to enter the tube 26 and rises through the tube into the conduit 22 back to the temperature sensitive valve 66. When the valve 66 senses a predetermined elevated water temperature, say slightly above ambient such as 100° F., it will open and discharge the hot water backing up through the conduit 22 to a suitable drain.

In the event that the auxiliary hot water being pumped into the hot water branch 16 from the refrigerating apparatus 40 enters the conduit 36 when valve 20 is open for discharging water therethrough, the heated water merely mixes with hot water being conducted from the hot water heating tank 24 to the valve 20 and is utilized as part of the hot water being delivered to the valve 20.

It is desirable in the heat recovery system described that the water circulating in heat transfer relationship with the condenser 44 and compressor 46 should not be permitted to enter the hot water branch 16 unless the temperature of the auxiliary hot water is sufficient to be beneficial to the hot water system. That is, the auxiliary hot water temperature should not be too low so that significant additional heating in the hot water heating tank 24 is needed should the valve 20 be closed or, if open, the auxiliary hot water should not significantly lower the temperature of the water being delivered to valve 20. For this purpose, I provide for a temperature sensitive valve 68 in conduit 54 which will permit water to flow from the pump 58 to the hot water branch 16 only when the heated water has a temperature of at least 110° F. This would be of particular importance when the refrigerating apparatus is first started up and there has not been sufficient by-product heat generated by the condenser 44 and compressor 46 to heat the water in conduit 54 to the predetermined elevated temperature of 110° F. After the refrigerating apparatus has been operating for some period of time, the water will be heated sufficiently to open the temperature sensitive valve 68 and start the pump 58 and allow the auxiliary hot water to be pumped into the hot water branch 16. Advantageously, the temperature sensitive valve 68 is located in conduit 54 in close proximity to where the heated water would reach its maximum temperature. In the embodiment shown, this would be just downstream of the compressor 52 as shown in the drawing.

It is also desirable in the event the cold water branch valve 18 is opened to prevent backflow of water from the conduit 54 into the cold water branch 14. For this purpose, I provide for a backflow check valve 70 in conduit 54. In this manner, cold water can only flow in a direction from the cold water branch 14 to the refrigerating apparatus 10.

While the preferred embodiment of the invention has been illustrated and described herein, it is realized that numerous modifications and changes will occurred to those skilled in the art. It is therefore to be understood that the appended claims are intended to cover all such modifications and changes as fall within the true spirit and scope of the invention.

What is claimed is:

1. A method of providing auxiliary hot water to a water system including:
   (a) conducting water into the system from a water supply,
   (b) dividing the incoming water at a junction into a cold water branch and a hot water branch said hot water branch including a hot water heating tank, each branch terminating downstream at a valve,
   (c) introducing water to be heated into the bottom of the hot water heating tank and expelling hot water out the top thereof for delivery to the hot water branch valve,
   (d) conducting water from the cold water branch to refrigerating apparatus having a condenser, evaporator and compressor, constantly when the refrigerating apparatus is operating,
   (e) circulating the water in heat transfer relationship with the condenser to heat the water, and
   (f) pumping the heated water from the refrigerating apparatus into the hot water branch between the hot water heating tank and the hot water branch valve when the temperature of the heated water is above 110° F.

2. The method of claim 1 wherein the cold water is also circulated in heat transfer relationship with the compressor.

3. The method of claim 1 wherein flow of water from the refrigerating apparatus to the cold water branch is prevented by a backflow check valve when the cold water branch valve is open.

4. The method of claim 1 wherein hot water in excess of the capacity of the hot water heating tank is expelled from the hot water branch between the hot water heating tank and the junction of the hot water branch and the cold water branch.

5. The method of claim 4 wherein the hot water in excess of the capacity of the hot water heating tank is expelled by opening a temperature sensitive valve at a water temperature slightly above ambient.

* * * * *